United States Patent [19]

Young et al.

[11] Patent Number: 4,668,376

[45] Date of Patent: * May 26, 1987

[54] SUPPORTED, MN SULFIDE PROMOTED MO AND W SULFIDE HYDROPROCESSING CATALYSTS AND USES THEREOF

[75] Inventors: Archie R. Young, Montclair; Teh C. Ho, Bridgewater; Allan J. Jacobson, Princeton; Russell R. Chianelli, Somerville, all of N.J.

[73] Assignee: Exxon Research and Engineering Company, Florham Park, N.J.

[ * ] Notice: The portion of the term of this patent subsequent to May 5, 2004 has been disclaimed.

[21] Appl. No.: 687,534

[22] Filed: Dec. 28, 1984

[51] Int. Cl.$^4$ .............. C10G 45/08; C10G 45/50; C10G 47/06; C10G 47/12

[52] U.S. Cl. ...................... 208/108; 208/112; 208/215; 208/216 R; 208/143; 208/254 H; 208/257; 208/264; 208/289

[58] Field of Search ............. 208/215, 216 R, 257 H, 208/254 H, 257, 263, 264, 289, 108, 112, 143; 502/219, 220, 221

[56] References Cited

U.S. PATENT DOCUMENTS

| | | | |
|---|---|---|---|
| 2,744,052 | 5/1956 | Nozaki | 502/219 |
| 2,885,349 | 5/1959 | Hansford | 208/109 |
| 2,939,837 | 6/1960 | Borger | 208/136 |
| 4,192,735 | 3/1980 | Aldridge et al. | 208/112 |
| 4,243,553 | 1/1981 | Naumann et al. | 423/53 X |
| 4,243,554 | 1/1981 | Naumann et al. | 423/53 X |

OTHER PUBLICATIONS

Konings et al., *J. Catalysis*, vol. 76, 1982, pp. 466–472.
Konings et al., *J. Catalysis*, vol. 76, 1982, pp. 473–476.

*Primary Examiner*—Olik Chaudhuri
*Attorney, Agent, or Firm*—Edward M. Corcoran

[57] ABSTRACT

This invention relates to the preparation and use of supported, manganese sulfide promoted molybdenum and tungsten sulfide catalysts useful for hydroprocessing processes, particularly hydrotreating. These catalysts are prepared by heating a composite of support material and precursor salt under oxygen-free conditions and in the presence of sulfur, wherein said precursor salt contains a thiometallate anion of Mo, W or mixture thereof and a cation comprising one or more promoter metals which are chelated by at least one neutral, nitrogen-containing polydentate ligand, and wherein said promoter metal comprises Mn alone or a mixture of Mn with Co, Ni, Zn, Cu or mixture thereof.

18 Claims, No Drawings

SUPPORTED, MN SULFIDE PROMOTED MO AND W SULFIDE HYDROPROCESSING CATALYSTS AND USES THEREOF

BACKGROUND OF THE INVENTION

1. Field of the Invention

This invention relates to a process for the preparation of supported, manganese sulfide promoted molybdenum and tungsten sulfide catalysts, the supported species prepared by such process, and to the use of such supported catalysts for hydroprocessing processes, particularly hydrotreating. More particularly, this invention relates to the preparation and use of supported catalysts useful for hydroprocessing processes such as hydrotreating wherein said catalysts are formed by heating, at elevated temperature, in the presence of sulfur and under oxygen-free conditions, a composite of a support material and one or more catalyst precursor salts comprising a thiometallate salt of the general formula (ML) (Mo$_y$W$_{1-y}$S$_4$) wherein M comprises divalent manganese and, optionally, divalent Ni, Co, Zn, Cu or mixture thereof, wherein y is any value ranging from 0 to 1, and wherein L is one or more, neutral, nitrogen-containing ligands at least one of which is a chelating polydentate ligand.

2. BACKGROUND OF THE DISCLOSURE

The petroleum industry is increasingly turning to coal, tar sands, heavy crudes and resids as sources for future feedstocks. Feedstocks derived from these heavy materials contain more sulfur and nitrogen than feedstocks derived from more conventional crude oils. Such feedstocks are commonly referred to as being dirty feeds. These feeds therefore require a considerable amount of upgrading in order to obtain usable products therefrom, such upgrading or refining generally being accomplished by hydrotreating processes which are well-known in the petroleum industry.

These processes require the treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrotreating relatively light feeds, the feeds are treated with hydrogen, often to improve odor, color, stability combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrotreating. Carbon yield is reduced, and gasoline yield is generally increased. In the hydrodesulfurization of heavier feedstocks, or residua, the sulfur compounds are hydrotreating and cracked. Carbon-sulfur bonds are broken, and the sulfur for the most part is converted to hydrogen sulfide which is removed as a gas from the process. Hydrodenitrogenation, to some degree also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrosulfurization, to some degree also generally accompanies hydrodenitrogenation reactions. In the hydrodesulfurization of relatively heavy feedstocks, emphasis is on the removal of sulfur from the feedstock. In the hydrodenitrogenation of relatively heavy feedstocks emphasis is on the removal of nitrogen from the feedstock. Albeit, although hydrodesulfurization and hydrodenitrogenation reactions generally occur together, it is usually far more difficult to achieve effective hydrodenitrogenation of feedstocks than hydrodesulfurization of feedstocks.

Catalysts most commonly used for these hydrotreating reactions include materials such as cobalt molybdate on alumina, nickel on alumina, cobalt molybdate promoted with nickel, nickel tungstate, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc. reactions.

In general, with molybdenum and other transition metal sulfide catalysts as well as with other types of catalysts, higher catalyst surface areas generally result in more active catalysts than similar catalysts with lower surface areas. Thus, those skilled in the art are constantly trying to achieve catalysts that have higher surface areas. More recently, it has been disclosed in U.S. Pat. Nos. 4,243,553, and 4,243,554 that molybdenum sulfide catalysts of relatively high surface area may be obtained by thermally decomposing selected thiomolybdate salts at temperatures ranging from 300°–800° C. in the presence of essentially inert, oxygen-free atmospheres. Suitable atmospheres are disclosed as consisting of argon, a vacuum, nitrogen and hydrogen. In U.S. Pat. No. 4,243,554 an ammonium thiomolybdate salt is decomposed at a rate in excess of 15° C. per minute, whereas in U.S. Pat. No. 4,243,553, a substituted ammonium thiomolybdate salt is thermally decomposed at a very slow heating rate of from about 0.5 to 2° C./min. The processes disclosed in these patents are claimed to produce molybdenum disulfide catalysts having superior properties for water gas shift and methanation reactions and for catalyzed hydrogenation or hydrotreating reactions.

SUMMARY OF THE INVENTION

This invention relates to a process for the preparation of supported catalysts comprising manganese sulfide promoted molybdenum and tungsten sulfifde catalysts, the supported species prepared by such process, and to the use of such supported catalyst species for hydroprocessing processes, particularly hydrotreating. Thus, the catalytic metals present in a catalyst of this invention must include at least two metals. They are (i) manganese and (ii) Mo or W. In one embodiment the catalysts compositions of this invention will also contain a sulfide of Ni, Co, Zn, Cu or mixture thereof. These catalysts have been found to be useful as hydroprocessing catalysts such as hydrotreating catalysts having high activity and selectivity for nitrogen removal.

The catalysts of this invention are prepared by heating, at elevated temperature, in the presence of sulfur and under oxygen-free conditions, a composite of support material and one or more catalyst precursor salts containing a thiometallate anion of Mo, W or mixture thereof and a cation containing manganese as a promoter metal and, optionally, Ni, Co, Cu, Zn or mixture thereof as additional promoter metal, wherein said promoter metals are chelated by at least one neutral, nitrogen-containing polydentate ligand. With the possible exception of Co which can be either divalent or trivalent, the chelated promoter metal in the cation will be in the divalent state. However, for all practical purposes, all of the promoter metals in the precursor salt or salts, including Co, will be in the divalent state.

These precursor salts will be of the general formula (ML) $(Mo_yW_{1-y}S_4)$ wherein M comprises divalent manganese and, optionally, divalent Ni, Co, Cu, Zn or mixture thereof in addition to the manganese, wherein y is any value ranging from 0 to 1 and wherein L is one or more neutral, nitrogen-containing ligands, at least one of which is a chelating polydentate ligand. In a preferred embodiment, ligand L will have a denticity of six and will be either three bidentate or two tridentate chelating ligands. It will be appreciated that, because the catalyst compositions of this invention must contain manganese along with Mo, W or mixture thereof, the precursor salt or salts must contain the same metals. Optionally, both the catalyst composition of this invention and the precursor salts may also contain Ni, Co, Cu, Zn or mixture thereof.

Hydroprocessing processes is meant to include any process that is carried out in the presence of hydrogen including, but not limited to, hydrocracking, hydrodenitrogenation, hydrodesulfurization, hydrogenation of aromatic and unsaturated hydrocarbons, methanation, water gas shift, etc. These reactions include hydrotreating and hydrorefining reactions, the difference generally being thought of as more of a difference in degree than in kind, with hydrotreating conditions being more severe than hydrorefining conditions. Some of the catalysts of this invention have been found to have hydrotreating or hydrorefining activity greater than that of catalysts derived from conventional hydrotreating catalyst precursors such as cobalt molybdate on alumina, even though their surface areas are not as high.

DETAILED DESCRIPTION OF THE INVENTION

The precise nature and composition of the catalyst species that is formed as a result of heating the composite of precursor salt and support material in the presence of sulfur and under oxygen-free conditions is not known. The composition of the corresponding bulk, unsupported catalyst species is defined in U.S. patent application Ser. No. 687,552 jointly filed by A. J. Jacobson, R. R Chianelli and T. A. Pecoraro on even date herewith. Unlike applicants' species, however, the catalyst species of Jacobson et al. are unsupported, bulk catalysts and are unique in that they comprise a mixture of (i) microcrystallites of metal sulfide of a metal selected from the group consisting of Mo, W and mixture thereof and (ii) poorly crystalline manganese sulfide. In one embodiment, the compositions of the Jacobson et al. invention may also contain metal sulfide of additional promoter metal selected from the group consisting of Ni, Co, Cu, Zn and mixture thereof.

Electron microscope and other analytical techniques have revealed that the size of the molybdenum and/or tungsten microcrystallites present in the bulk, unsupported catalyst species defined in co-pending Ser. No. 687,552 generally have dimensions less than about 0.1 microns by 0.01 microns. In a preferred embodiment the microcrystallite sizes are less than about 0.05 microns by 0.01 microns and still more preferably less than 0.015 microns by 0.005 microns.

Compositions of the bulk, unsupported catalyst species defined in co-pending Ser. No. 687,552 were also analyzed using X-ray diffraction (XRD). The X-ray diffraction patterns were consistent with $MoS_2$ microcrystallites of the size observed by the electron microscope. The X-ray patterns all contained a broad peak between approximately 10° and 15° $2\theta$ which is indicative of stacks of $MoS_2$ microcrystallites with a stack number of about 4. The X-ray powder diffractions analysis also revealed that the manganese sulfide present in the bulk, unsupported species exhibited poor crystallinity. Those skilled in the art know that poorly crystalline materials exhibit broadened Bragg peaks as opposed to sharp Bragg peaks exhibited by crystalline materials.

Those skilled in the art are well-acquainted with this technique (XRD) in which a monochromatic X-ray beam impinges on the sample. Samples of the catalysts were ground to a fine powder and packed into an aluminum tray with a cylindrial recess 25 mm in diameter and 1 mm in depth. The top surface of the sample was flat and co-planar with the top of the aluminum tray after this preparation. Measurements were made in ambient atmosphere using a Siemens D500 X-ray diffractometer in $0-2\theta$ reflection (Bragg-Brentano) geometry. The incident X-ray beam was taken from a fixed anode copper target with a wavelength of 1.54178 A. The diffracted beams were monochromated using a graphite monochromater to minimize fluorescence and were detected using a proportional counter detector. Data were collected by stepping the detector in angular increments of 0.02° $2\theta$ and counting at each step for two seconds.

The corresponding unsupported bulk species were also examined in an electron microscope at a magnification of 680,000X with an electron microscope having a 4 Å point-to-point resolution. Examination of micrographs of these composiions revealed many lines 6.2 A apart and generally not more than 150 Å in length. It is well known in the art (see for example R. R. Chianelli, International Reviews in Physical Chemistry, (1982), 2(127–165) that such lines with the 6.2 Å spacings are characteristic of $MoS_2$. $MoS_2$ occurs in layers which are seen to be highly disordered and occurring singly or stacked, but in the micrograph of the bulk, unsupported species the degree of stacking is generally not more than eight stacks and usually not more than four stacks.

In one method of preparing the supported catalyst species of this invention, a slurry of precursor salt is incorporated with a pre-selected quantity of refractor inorganic oxide support material, preferably a particulate mass of said support, with the resulting composite then dried and the dried, particulate, composite then heated in an oxygen-free atmosphere in the presence of sulfur or sulfur-bearing compound at elevated temperature to form the catalyst species of this invention. A sufficient amount of the precursor salt or salts is composited with the support so that prior to, or at the time that the composite of support and precursor material is heated in the presence of sulfur and under oxygen-free conditions, generally from about 5 weight percent to about 50 weight percent of the salt, expressed as weight of $MoO_3$ or $WO_3$ on an ignition loss free basis, will be present on the support. The supported catalyst species of this invention are highly active and selective as hydrotreating catalysts.

In one embodiment, the supported catalyst species of this invention are formed by forming the precursor in the presence of a slurry of colloidal or non-colloidal particles of support material. Typical support materials include alumina, diatomaceous earth, zeolite, silica, activated carbon, magnesia, zirconia, boria, chromia, titania and the like. A preferred support for the practice of the present invention is one having a surface area of more than 50 $m^2/g$, preferably from about 100 to 300 $m^2/g$.

As previously stated, the catalysts of this invention may be prepared from a composite of inorganic refractory oxide metal oxide support material and one or more precursor salts. The catalyst precursor salt or salts will have the formula (ML) $(Mo_yW_{1-y}S_4)$ wherein M is divalent manganese and, optionally, a mixture of divalent Mn with divalent Ni, Co, Cu, Zn or mixture thereof Thus, M may be only divalent Mn in which case the precursor would have the formula (MnL) $(Mo_yW_{1-y}S_4)$. Alternatively the M may be a mixture of divalent Mn with divalent Ni, Co or mixture thereof. For the case of two metals, such as Mn and Co, the precursor would have the formula $[(Mn_aCo_{1-a})L](Mo_yW_{1-y}S_4)$ wherein $0<a<1$. In the case of three divalent metals the precursor would have the formula of the form $[(Mn_aCo_bNi_c)L](Mo_yW_{1-y}S_4)$ wherein $0<a$, b or $c<1$ and $a+b+c=1$. The precursor may be a self promoted thiomolybdate, thiotungstate or combination thereof. If it is only a thiomolybdate it is obvious that y will have a value of 1. Alternatively, if the precursor is a thiotungstate y will be zero.

If desired, more molybdenum and/or tungsten sulfide may be incorporated into the catalyst composition than is permitted by the stoichiometric amount present in the (ML) $(Mo_yW_{1-y}S_4)$ precursor salt, by mixing said precursor salt with one or more thiometallate salts of the general formula (L′)$(Mo_yW_{1-y}S_4)$. In the formula (L′)$(Mo_yW_{1-y}S_4)$, L′ is the conjugate acid of one or more ligands, L, with a charge sufficient to balance the dinegative charge of the thiometallate anion. In its conjugate acid form the ligand forms a cation $[L']^{2+}$ which is ionically bound to the thiometallate anion. For example, if L is ethylenediamine (en), L′ will be [H₂en] and the corresponding thiomolybdate salt, for example, will be [H₂en](MoS₄). For diethylene triamine, (dien), the corresponding salt will be [H₂ dien](MoS₄). These salts, (L′)$(Mo_yW_{1-y}S_4)$ may be prepared, for example, by dissolving ammonium thiometallate in excess of ligand or ligands L. The salt may then be recovered by addition of water or some other suitable antisolvent such as methanol or acetone.

The ligand L, will generally have a denticity of six and will be one or more neutral, nitrogen containing ligands wherein at least one of said ligands is a multidentate chelating ligand which chelates the divalent promoter metal to form a chelated promoter metal cation $[ML]^{2+}$. Thus, the catalytic metal sulfide anion $(Mo_yW_{1-y}S_4)^{2-}$ will be ionically bound to the chelated promoter metal cation $[ML]^{2+}$. By neutral is meant that the liquid itself does not have a charge.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor molecule, then one must also use at least one polydentate chelating ligand. Preferably L will be one or more polydentate chelating ligands. The denticity of the ligand L will generally be six, because the promoter metal cations prefer six-fold coordination. Hence, if more than one species of ligand is employed in the precursor molecule, the denticity of the ligand species will usually add up to six. It should be understood that it is possible for ligand L to have a total denticity of less than six, but in most cases L will have a total denticity of six. Thus, L will be three bidentate ligands, two tridentate ligands, a mixture of a bidentate and a quadridentate ligand, a hexadentate ligand or a mixture of a polydentate ligand with monodentate ligands as long as the combination has a total denticity of six. As has heretofore been stated, it is preferred to use chelating bidentate and tridentate ligands. In general, the ligands useful in this invention include alkyl and aryl amines and nitrogen heterocycles. Illustrative but non-limiting examples of ligands useful in the catalyst precursors of this invention are set forth below.

Monodentate ligands will include NH₃ as well as alkyl and aryl amines such as ethyl amine, dimethyl amine, pyridine, etc. Useful chelating bidentate amine ligands are illustrated by ethylenediamine, 2,2′-bipyridine, o-phenylene diamine, tetramethylethylenediamine and propane-1,3 diamine. Similarly, useful chelating tridentate amine ligands are represented by terpyridine and diethylenetriamine while triethylenetetramine is illustrative of a useful chelating quadridentate amine ligands. Useful chelating pentadentate ligands include tatraethylenepentamine while sepulchrate (an octazacryptate) is illustrative of a suitable chelating hexadentate ligand. However, as a practical matter it will be preferred to use chelating, polydentate alkyl amines for L. Illustrative, but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine (en), and diethyleneriamine, (dien).

Many of the precursor salts useful in forming the catalysts of this invention and methods for preparing them are known in the art, although it has not heretofore been known that such salts can be useful catalyst precursors. An article by Diemann and Mueller titled Thio and Seleno Compounds of the Transition Metals with d° Configuration published in COORD. CHEM. REV. 10:79–122 provides a review of known salts.

In general, the precursor salts useful for forming the catalysts of this invention may be prepared by mixing an aqueous solution of ammonium thiomolybdate and/or thiotungstate with an aqueous solution of the chelated promoter metal cation [ML]$^{2+}$ which results in the formation of the precursor salt as a precipitate which is readily recovered. The chelating promoter cation is easily formed by, for example, mixing an aqueous solution of one or more water soluble promoter metal salts with the ligand or mixture of ligands. The water soluble salt may be any water soluble salt that is convenient to use such as a halide, sulfate, perchlorate, acetate, nitrate, etc. Alternatively, an aqueous solution of ammonium thiomolybdate and/or tungstate may be mixed with the ligand with the resulting solution mixed with an aqueous solution of promoter metal salt or the salt can be added to the ligand and dissolved into the solution of thiomolybdate and/or thiotungstate.

Any steps of the above procedure may be done in the presence of a slurry of support material in which case the precursor salt or salts will be precipitated onto the support to form a catalyst precursor composite. Alternatively, the precursor salt or salts may be prepared separately and then mixed, either as a slurry or powder, with support material to form the catalyst precursor composite. The catalyst and catalyst precursor preparation will be further understood by reference to the Examples, infra. However, it should be understood that the catalyst precursor preparation is not intended to be limited to aqueous media.

The catalysts of this invention may be prepared by heating a composite of support material and one or more catalyst precursor salts, in the presence of sulfur in an oxygen-free atmosphere or environment, at a temperature of at least about 150° C., preferably at least about 200° C. for a time sufficient to form the catalyst. The sulfur required during the formation of the catalyst may be that which is present in the precursor salt in which case the expression "in the presence of sulfur" means that sulfur is present in the precursor salt. Thus, it has been found that catalyst compositions of this invention will be formed if no excess sulfur is present and if the oxygen-free atmosphere is relatively inert, such as nitrogen. In some case, however, it is preferred that the sulfur will be present in an amount in excess of that contained in the precursor salt. In those cases where it is preferred that the catalyst be formed by heating the precursor in the presence of excess sulfur, it is also preferred that the excess sulfur be present in the form of a sulfur bearing compound which can be one or more solids, liquids, gases or mixtures thereof. Mixtures of hydrogen and H$_2$S have been found to be particularly suitable. Typically the temperature will range between from about 200°–600° C., preferably from about 250°–600° C., more preferably from about 250°–500° C. and still more preferably from about 300°–400° C. The non-oxidizing atmosphere may be gaseous, liquid or mixture thereof.

As discussed under Background of the Disclosure, molybdenum and tungsten sulfide catalysts have many uses, including hydrotreating. Hydrotreating conditions vary considerably depending on the nature of the hydrocarbon being treated, the nature of the impurities or contaminants to be reacted or removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feed boiling within a range of from about 290° to 550° C. or a residuum containing from about 10 percent to about 50 percent of a material boiling above about 575° C.

| | Typical Hydrotreating Conditions | | | |
|---|---|---|---|---|
| Feed | Temp., °C. | Pressure psig | Space Velocity V/V/Hr | Hydrogen Gas Rate SCF/B |
| Naphtha | 100–370 | 150–800 | 0.5–10 | 100–2000 |
| Diesel Fuel | 200–400 | 250–1500 | 0.5–6 | 500–6000 |
| Heavy Gas Oil | 260–430 | 250–2500 | 0.3–4 | 1000–6000 |
| Lube Oil | 200–450 | 100–3000 | 0.2–5 | 100–10,000 |
| Residuum | 340–450 | 1000–5000 | 0.1–2 | 2000–10,000 |

It should be noted that the compositions of this invention are useful for lube oil refinery processes wherein it is desirable to remove oxidation initiating nitrogen compounds from lube oil feeds.

The invention will be further understood by reference to the following examples.

EXAMPLES

Catalyst Precursor Preparation

Manganese ethylenediamine thiomolybdate Mn(en)$_3$MoS$_4$ catalyst precursor was prepared by dissolving ammonium thiomolybdate into ethylenediamine (en) and cooling the resulting dark red solution to 0° C. in an ice bath. An aqueous solution of manganese chloride was slowly added, in aliquots, to the dark red solution, with agitation after the addition of each aliquot. A precipitate was formed and recovered by vacuum filtration. This precipitate was Mn(en)$_3$MoS$_4$ and was washed with distilled water and ethanol and then dried in a vacuum oven at 50° C. for three hours.

The resulting catalyst precursor powder was screened, pelletized and sized to 20/40 mesh (Tyler).

Example 1

In this example a catalyst of this invention was was prepared by heating a manganese trisethylenediamine thiomolybdate Mn(en)$_3$MoS$_4$ [prepared by the method described in S. J. Tauster et al. in J. of Cat. 63, 515 (1980)] precursor salt, in a mixture of H$_2$/H$_2$S (15% H$_2$S) at 375° C. for two hours. A catalyst formed by heating ammonium thiomolybdate (NH$_4$)$_2$MoS$_4$ in the H$_2$/H$_2$S mixture was used as a control. The resulting black solid was pressed into pellets under 15,000–20,000 psi and then meshed through 10/20 mesh or 20/40 mesh sieves. One gram of this meshed catalyst was mixed with 10 g of 1/16-in. spheroid porcelain beads and placed in the catalyst basket of a Carberry-type autoclave reactor. The remainder of the basket was filled with more beads. The reactor was designed to allow a constant flow of hydrogen through the feed and to permit liquid sampling during operation.

After the catalyst and beads were charged to the reactor, the reactor system was flushed with helium for about 30 minutes after which hydrogen flow through the reactor was initiated at a rate of 100 STD cc/min. After the hydrogen began flowing through the reactor, the reactor was charged with 100 cc of a feed comprising a DBT/decalin mixture which was prepared by dissolving 4.4 g of dibenzothiophene (DBT) in 100 cc of hot decalin. The solution thus contained about 5 wt.% DBT or 0.8 wt.% S. The hot feed solution was filtered and 1 cc of decane was added.

After the feed was charged to the reactor, the hydrogen pressure was increased to about 450 psig and the temperature in the reactor raised from room temperature to about 350° C. over a period of about ½ hour. The hydrogen flow rate through the reactor was maintained at about 100 STD cc per minute. When the desired temperature and pressure were reached, a GC sample of liquid was taken and additional samples taken at one hour intervals thereafter. The liquid samples from the reactor were analyzed using a gas chromatograph.

As the reaction progressed, samples of liquid were withdrawn once an hour and analyzed by gas chromatography in order to determine the activity of the catalyst towards hydrodesulfurization. The hydrodesulfurization activity was determined according to the following model reaction:

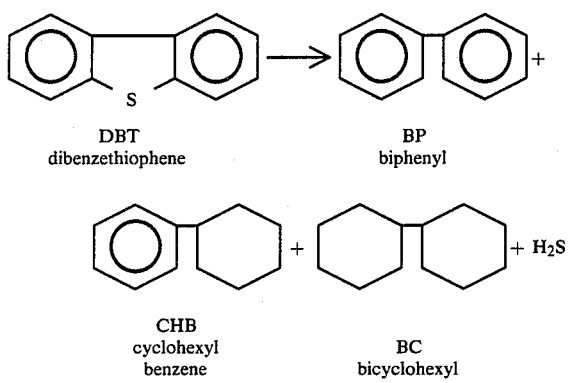

The hydrodesulfurization activity or zero order rate constant, k, for the catalyst was found to be $15 \times 10^{16}$ molecules of DBT desulfurized per gram of catalyst per second. This activity was determined at a DBT conversion level $\leq 50\%$. The results are summarized in Table I.

TABLE I

| | HDS Activity in DBT/Decalin at 350° C. | | |
|---|---|---|---|
| Example No. | Catalyst Precursor | HDS rate constant k, per gm. of catalyst per sec. $\times 10^{16}$ | BET Catalyst Surface area, m²/gm |
| Control | $(NH_4)_2MoS_4$ | 36 | 108 |
| 1 | $Mn(en)_3MoS_4$ | 15 | 28 |

Example 2

Preparation and Evaluation of Mn—Mo—S Bulk Catalyst

Preparation of Precursor

A solution of 40.0 g of $(NH_4)_2MoS_4$ in 82 ml of en was prepared and cooled in an ice bath. Also, 22.8 ml of an aqueous $Mn(NO_3)_2$ solution containing 1. g/ml of the salt was diluted with 250 ml $H_2O$, followed by the addition of 25 ml of en.

The Mn solution was added dropwise to the $(NH_4)_2MoS_4$ solution. Agitation was continued for 20 minutes, the sample filtered, washed with ethanol and left to dry in the filter funnel, yielding a precursor of the formula $Mn(en)_3MoS_4$.

Catalyst Preparation

For this experiment the catalyst precursor salt was pelletized using a 4% aqueous solution of polyvinyl alcohol and was placed into a stainless steel reactor at 100° C. at atmospheric pressure where it was purged for one hour under nitrogen. Ten percent of hydrogen sulfide in hydrogen was introduced into the reactor at a space velocity of 0.75 SCF/hr for each 10 cc of catalyst in the reactor. The temperature in the reactor was then raised to 325° C. and kept at this temperature for three hours to form the catalyst after which the temperature in the reactor was lowered to 100° C., the $H_2S/H_2$ gas flow was stopped and the reactor was purged with nitrogen until room temperature was reached.

Reaction Conditions

About 20 g of the catalyst was loaded into a fixed bed reactor. Hydrotreating was carried out at the conditions set forth in Table II below. Liquid product was analyzed for total sulfur by X-ray fluorescence and for nitrogen by combustion analysis. The feedstock was a light catalytic cycle oil (LCCO) that was about 20% paraffinic, having sulfur and nitrogen contents of 1.43 wt.% S and 321 ppm N.

TABLE II

| Hydrotreating With Catalyst Derived from Precursor $Mn(en)_3MoS_4$ | | | |
|---|---|---|---|
| Reactor Pressure | | 3.15 MPa | |
| Reactor Temperature | | 325–327° C. | |
| LHSV | | 2.8–4.0 | |
| Hydrogen Rate | | 3000 SCF/B | |
| Catalyst Life, Hrs. | LHSV | % HDS | % HDN |
| 71 | 4.0 | 35.5 | 36.8 |
| 119 | 2.8 | 44.8 | 46.1 |

Example 3

Preparation and Evaluation of Mn/Ni/Mo—S Bulk Catalyst

Preparation of Precursor

A solution of 40.0 g of $(NH_4)_2MoS_4$ in 82 ml of en was prepared and cooled in an ice bath. Also, 11.0 ml of an aqueous solution containing 1.25 g $Mn(NO_3)_2$/ml and 22.38 g of $Ni(NO_3)_2.6H_2O)$ were dissolved in 250 ml $H_2O$, and 20 ml of en was stirred into this promoter solution.

The Mn/Ni solution was added dropwise to the molybdate solution, and stirring continued for 20 minutes after the addition was completed.

A precipitate formed which was recovered by filtration, washing with ethanol and drying overnight, yielding a precursor of the formula $Mn_{0.5}Ni_{0.5}(en)_3MoS_4$.

Catalyst Preparation

The precursor was pelletized and the catalyst was prepared using the same procedure as in Example 2.

Reaction Conditions

Similarly to Example 2, catalyst evaluations were carried out on LCCO in a fixed bed reactor on about 20 g of the catalyst. Hydrotreating conditions and results are set forth in Table III below.

TABLE III

| Hydrotreating With Catalyst Derived From Precursor $Mn_{0.5}Ni_{0.5}(en)_3MoS_4$ | |
|---|---|
| Reactor Pressure | 3.15 MPa |
| Reactor Temperature | 323° C. |
| LHSV | 4.2 |
| Hydrogen Rate | 3000 SCF/B |

TABLE III-continued

| Catalyst Life, hrs. | % HDS | % HDN |
| --- | --- | --- |
| 43 | 83.36 | 86.92 |
| 91 | 80.07 | 73.21 |

Example 4

Preparation and Evaluation of Mn—Mo—S Catalyst Supported on $SiO_2$ 48 g of a colloidal suspension of 34% $SiO_2$ in water was diluted to 400 ml with deionized water. To this was added a solution of 5.75 g $MnSO_4.H_2O$ in 50 ml $H_2O$, to which about 2 ml of $H_2SO_4$ had been added to clear up any turbidity. A thiomolybdate solution, prepared by dissolving 8.8 g $(NH_4)_2MoS_4$ in 100 ml $H_2O$ and 25 ml en, was then added dropwise to the silica suspension, stirring vigorously. This formed an orange precipitate, which was recovered by filtration, washed and dried at 50° C. in a vacuum oven. The product was screened and the 20/40 mesh solid was sulfided as described in Example 2.

Evaluation of this supported catalyst in a fixed bed reactor under conditions quite similar to Examples 2 and 3 showed that $K_{HDS}$ was about 0.65 average.

What is claimed is:

1. A process for hydrorefining a hydrocarbon feed which comprises contacting said feed at a temperature of at least about 150° C. and in the presence of hydrogen with a catalyst obtained by compositing inorganic refractory oxide support material with one or more precursor salts and heating said composite at elevated temperature of at least about 150° C., in the presence of sulfur or sulfur bearing compound and under oxygen-free conditions for a time sufficient to form said catalyst, wherein said precursor salt contains a tetrathiometallate anion of Mo, W or mixture thereof and a cation containing at least one divalent promoter metal selected from the group consisting of (a) manganese and (b) a mixture of manganese with one or more metals selected from the group consisting of Ni, Co, Cu, Zn or mixture thereof, and wherein said divalent metal or metals are chelated by at least one neutral, nitrogen-containing polydentate ligand, said contacting occurring for a time sufficient to hydrotreat at least a portion of said feed.

2. The process of claim 1 wherein said thiometallate salt is of the formula $(ML)(Mo_yW_{1-y}S_4)$ wherein M comprises one or more of said divalent promoter metals, wherein y is any value ranging from 0 to 1 and wherein L is one or more neutral, nitrogen-containing ligands, at least one of which is a chelating polydentate ligand.

3. The process of claim 1 wherein said precursor salt is formed in the presence of a slurry of particles of support material.

4. The process of claim 2 wherein said precursor salt is formed in the presence of a slurry of particles of support material.

5. The process of any of claims 1, 2, 3 or 4 wherein said ligand is selected from the group consisting of alkyl amines, aryl amines, nitrogen heterocycles and mixtures thereof.

6. The process of claim 5 wherein said feed is a lube oil feed.

7. The process of claim 6 wherein said ligand comprises an alkyl amine.

8. A process for removing nitrogen from a nitrogen-containing hydrocarbon feed which comprises contacting said feed at a temperature of at least about 150° C. and in the presence of hydrogen with a catalyst obtained by compositing inorganic refractory oxide support material with one or more precursor salts and heating said composite at elevated temperature of at least about 150° C., in the presence of sulfur or sulfur-bearing compound and under oxygen-free conditions for a time sufficient to form said catalyst, wherein said precursor salt contains a tetrathiometallate anion of Mo, W or mixture thereof and a cation containing at least one divalent promoter metal selected from the group consisting of (a) manganese and (b) mixtures of manganese with one or more metals selected from the group consisting of Ni, Co, Cu, Zn or mixture thereof, wherein said divalent metal or metals are chelated by at least one neutral, nitrogen-containing polydentate ligand, said contacting occurring for a time sufficient to remove at least a portion of nitrogen from said feed.

9. The process of claim 8 wherein said thiometallate salt is of the formula $(ML)(Mo_yW_{1-y}S_4)$ wherein M comprises one or more of said divalent promoter metals, wherein y is any value ranging from 0 to 1 and wherein L is one or more neutral, nitrogen-containing ligands, at least one of which is a chelating polydentate ligand.

10. The process of claim 9 wherein said precursor salt is formed in the presence of a slurry of particles of support material.

11. The process of any of claims 9 or 10 wherein said ligand is selected from the group consisting of alkyl amines, aryl amines, nitrogen heterocycles and mixtures thereof.

12. The process of claim 11 wherein said feed is a lube oil feed.

13. The process of claim 12 wherein said ligand comprises an alkyl amine.

14. A process for hydrocracking a hydrocarbon feed which comprises contacting said feed at a temperature of at least about 150° C. and in the presence of hydrogen with a catalyst obtained by compositing inorganic refractory oxide support material with one or more precursor salts and heating said composite at elevated temperature of at least about 150° C., in the presence of sulfur or sulfur bearing compound and under oxygen-free conditions for a time sufficient to form said catalyst, wherein said precursor salt contains a tetrathiometallate anion of Mo, W or mixture thereof and a cation containing at least one divalent promoter metal selected from the group consisting of (a) manganese and (b) a mixture of manganese with one or more metals selected from the group consisting of Ni, Co, Cu, Zn or mixture thereof, and wherein said divalent promoter metal or metals are chelated by at least one neutral, nitrogen-containing polydentate ligand, said contacting occurring for a time sufficient to hydrocrack at least a portion of said feed.

15. The process of claim 14 wherein said precursor salt is formed in the presence of a slurry of particles of support material.

16. The process of either of claims 14 or 15 wherein said ligand is selected from the group consisting of alkyl amines, aryl amines, nitrogen heterocycles and mixtures thereof.

17. The process of clain 16 wherein said feed is a lube oil feed.

18. The process of claim 17 wherein said ligand comprises an alkyl amine.

* * * * *